(No Model.)

C. C. DOTEN.
NAIL.

No. 335,181. Patented Feb. 2, 1886.

WITNESSES:
Chas. S. Gooding
J. W. Redmond

INVENTOR:
Charles C. Doten
by Chs. Andrew
Attorney.

UNITED STATES PATENT OFFICE.

CHARLES C. DOTEN, OF PLYMOUTH, MASSACHUSETTS.

NAIL.

SPECIFICATION forming part of Letters Patent No. 335,181, dated February 2, 1886.

Application filed August 27, 1885. Serial No. 175,459. (No model.)

*To all whom it may concern:*

Be it known that I, CHARLES C. DOTEN, a citizen of the United States, residing at Plymouth, in the county of Plymouth and State of Massachusetts, have invented certain new and useful Improvements in Nails; and I do hereby declare that the following is a full, clear, and exact description of the invention, which will enable others skilled in the art to which it appertains to make and use the same.

The object of my invention is a nail having a head of such form as to act as a clamp, and adapted to serve both as a nail and clamp, especially in places like the partitions of cases, such as printers' cases or "pigeon-holes," as they are commonly called, so as to firmly unite the same at their angles.

Figure 1:
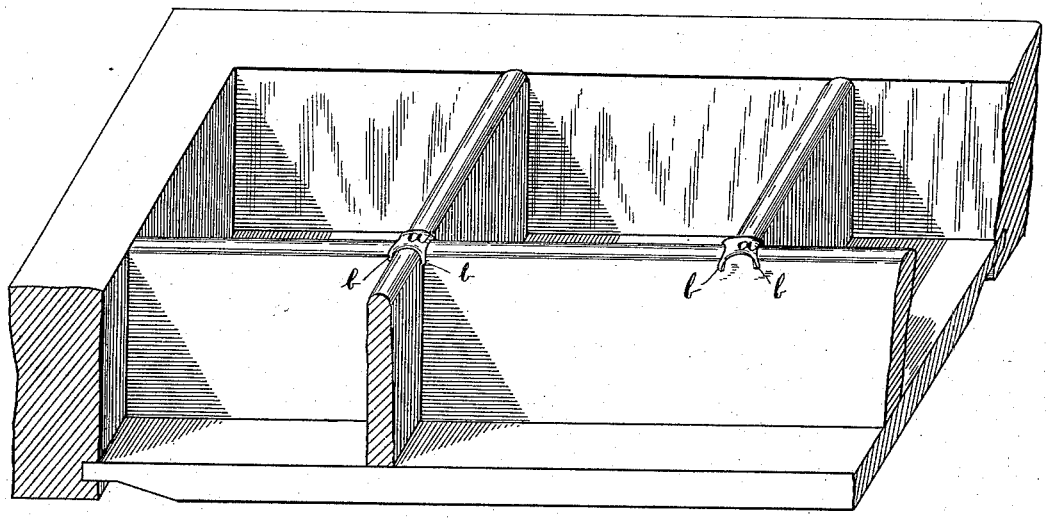
Figure 2:
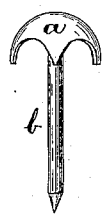
Figure 3:
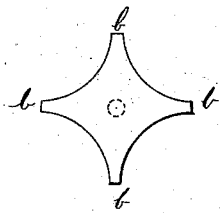

I have shown in the drawings, in Figure 1 a plan of a section of a case in which my nails are used, showing the heads $a$ $a$ of the same; in Fig. 2 an elevation of one of my nails; and in Fig. 3 a plan view of the head of one of my nails before the same have been shaped and the points turned down.

The shank of the nail I design to be made of any suitable form. The head is to be made as shown in Fig. 3, having four points, $b$ $b$, thereon, and formed as shown in Fig. 2, with the points turned down, and when the shank and head are made separately, either before or after the head and shank are united, so as to be parallel with the shank of the nail.

I have described a nail having a head with four points, but instead of that the head may have two or more points, although ordinarily I intend to make use of four; also, the nail may be made entirely of one metal—as brass or iron—or the head may be made of one and the shank of another metal.

In situations such as are shown in Fig. 1 each point $b$ of my nail occupying one of the four angles formed by the pieces to be united, it will be seen that the head with the points constitutes a very effective clamp, so as to firmly bind the pieces together.

What I claim and desire to secure by Letters Patent is—

A nail having the head provided with four points turned down parallel with the shank.

CHARLES C. DOTEN.

Witnesses:
 ARTHUR LORD,
 CHAS. W. BARNES.